US009104206B2

(12) United States Patent
Biber et al.

(10) Patent No.: US 9,104,206 B2
(45) Date of Patent: Aug. 11, 2015

(54) SELF-STEERING VEHICLE

(75) Inventors: Peter Biber, Poltringen (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 304 days.

(21) Appl. No.: 13/383,360

(22) PCT Filed: May 21, 2010

(86) PCT No.: PCT/EP2010/057025
§ 371 (c)(1),
(2), (4) Date: Mar. 23, 2012

(87) PCT Pub. No.: WO2011/003667
PCT Pub. Date: Jan. 13, 2011

(65) Prior Publication Data
US 2012/0179321 A1    Jul. 12, 2012

(30) Foreign Application Priority Data

Jul. 10, 2009    (DE) .......................... 10 2009 027 602

(51) Int. Cl.
*G01C 22/00*    (2006.01)
*G05D 1/02*    (2006.01)
(52) U.S. Cl.
CPC ............ *G05D 1/0272* (2013.01); *G05D 1/0259* (2013.01); *G05D 1/0265* (2013.01);
(Continued)
(58) Field of Classification Search
CPC . G05D 1/0272; G05D 1/0274; G05D 1/0278; G05D 1/0265; G06N 3/008; B62D 1/28; B60K 31/0008
USPC .................. 701/23–26; 700/245; 364/424.01, 364/424.02; 180/167–170; 318/587
See application file for complete search history.

(56) References Cited

U.S. PATENT DOCUMENTS 5,684,696 A * 11/1997 Rao et al. .......................... 701/25
5,758,298 A * 5/1998 Guldner .......................... 701/23
(Continued)

FOREIGN PATENT DOCUMENTS

CN        1565028 A    1/2005
DE    10 2004 013 811 A1    10/2005
(Continued)

OTHER PUBLICATIONS

International Search Report corresponding to PCT Application No. PCT/EP2010/057025, mailed Aug. 31, 2010 (German and English language document) (6 pages).

*Primary Examiner* — James Trammell
*Assistant Examiner* — Majdi Alsomiri
(74) *Attorney, Agent, or Firm* — Maginot, Moore & Beck LLP

(57) ABSTRACT

A self-controlling vehicle, designed for the autonomous movement in an area, is disclosed. The self-controlling vehicle includes driving means for movement and navigation means, wherein the navigation means are designed for the position determination along a closed path surrounding an operating space of the area. The navigation means are designed for creating successive path sectional data, the path sectional data for route sections of the path has assigned orientation information, in particular angle information, and the navigation means are assigned with autocorrelation means, which are designed such that they determine from a sequence of path sectional data corresponding to a movement along the path by determining auto correlation data whether and/or that the vehicle has driven completely along the surrounding path and/or a sequence of route sections already driven is driven again.

12 Claims, 2 Drawing Sheets

(52) U.S. Cl.
CPC ...... *G05D1/0274* (2013.01); *G05D 2201/0201* (2013.01); *G05D 2201/0203* (2013.01); *G05D 2201/0208* (2013.01); *G05D 2201/0215* (2013.01)

(56) References Cited

U.S. PATENT DOCUMENTS

| | | | | |
|---|---|---|---|---|
| 5,838,562 | A | * | 11/1998 | Gudat et al. ............... 701/23 |
| 5,956,250 | A | * | 9/1999 | Gudat et al. ............... 701/26 |
| 6,151,539 | A | * | 11/2000 | Bergholz et al. ........... 701/25 |
| 6,671,592 | B1 | | 12/2003 | Bisset et al. |
| 2003/0144774 | A1 | * | 7/2003 | Trissel et al. ............... 701/23 |
| 2003/0208304 | A1 | | 11/2003 | Peless et al. |
| 2005/0046373 | A1 | | 3/2005 | Aldred |
| 2007/0156286 | A1 | * | 7/2007 | Yamauchi ................. 700/245 |
| 2008/0027599 | A1 | * | 1/2008 | Logan et al. ............... 701/23 |

FOREIGN PATENT DOCUMENTS

| | | |
|---|---|---|
| DE | 602 20 435 T2 | 1/2008 |
| EP | 1 557 730 A1 | 7/2005 |
| WO | 03/039314 A2 | 5/2003 |

* cited by examiner

SELF-STEERING VEHICLE

This application is a 35 U.S.C. §371 National Stage Application of PCT/EP2010/057025 filed on May 21, 2010, which claims the benefit of priority to Serial No. DE 10 2009 027 602.5 filed on Jul. 10, 2009 in Germany, the disclosures of which are incorporated herein by reference in their entirety.

BACKGROUND

The present disclosure relates to a self-steering vehicle.

A typical representative of such a self-steering vehicle is what is referred to as an autonomous lawnmower (ARM) such as is known for a wide variety of purposes, in particular for domestic use. Such a self-steering device usually operates according to the principle of random navigation: this means that the ARM usually travels straight ahead until it meets a barrier (sensed by means of a sensor system or a border wire) and then turns at a randomly determined angle. Such a procedure is simple in terms of control technology and is, in particular, implemented without mapping (map data) of the surface to be worked on (working area), but this known procedure has in practice the disadvantage that complete (surface) coverage in accordance with the directions which are respectively traveled along in accordance with the angle is random, with the result that complete coverage is not ensured or only takes place after a very large number of route movements. This then leads again to disadvantageous redundancy in the form of multiple traversing.

It is also known from the prior art to allow a self-steering vehicle, for example an autonomous lawnmower, to travel over the working area on the basis of existing map data. However, a condition for this is usually a navigation system which is accurate (according to the mapping or a movement resolution) and which either causes a very large amount of expenditure, for example in the form of customary GPS technologies (and is therefore not very suitable, in particular, for a cost-sensitive domestic application) or else does not permit sufficient positional resolution for working on, in particular, relatively small surfaces.

In addition, it is known from the prior art to delimit the working area by means of a border wire (through which a current flows). Magnetic field sensors which are assigned to the ARM are then able to determine, through detecting the border wire signal (for example modulated onto the border wire), whether the ARM is inside or outside the boundary defined by the wire.

However, a particular challenge is not only to detect the border wire as such but also to detect a current position of the vehicle (ARM) along this border wire (which is typically closed since it completely surrounds a working area): such a procedure which detects when a starting point is reached when the vehicle travels along a boundary contour without a precise positioning or locating system is known from WO 03/039314. This prior art stores data items about the path traveled along at regular intervals during the travel process, wherein current data items are respectively compared with stored information in order to determine whether the same data items are present. However, the detection is based on the comparison of a current block of constant length (L) with a stored block of the same length; the method which is known from the prior art is therefore based on the fact that the characteristic of a block of this length is sufficient to identify the block unambiguously within the entire contour.

However, in practice, this is problematic because, in particular, simple contours such as, for example, a rectangular lawn surface already point to the obvious problem that the block of the length (L) will occur repeatedly. In addition, since further data items and peripheral conditions which could prevent such ambiguities are often not present on simple surfaces, this procedure is potentially subject to problems and requires improvement, not least because maps created in the known way can otherwise have critical errors.

SUMMARY

The object of the present disclosure is therefore to provide a self-steering vehicle which vehicle has improved navigation means to the effect that reliable determination of the contour of the working area and therefore reliable detection can be carried out and that the path enclosing the working area has been traveled along completely.

The object is achieved by the vehicle having the features set forth below. Advantageous developments of the vehicle are also described below.

In addition, an operating method for a self-steering vehicle having at least two method features is also set forth below.

In an inventively advantageous way, the navigation means process path section data items with a respectively assigned orientation information item. Auto-correlation means which are assigned according to the disclosure to the navigation means are then able to analyze sequences of path section data items (with those assigned orientation information items), to determine auto-correlation (by creating auto-correlation data items) and then to determine on this basis whether the vehicle has completely traveled along the enclosing path (or whether a sequence of route sections which has already been traveled along is being traveled along again).

Within the scope of the disclosure it is particularly preferred to design the self-steering vehicle as an autonomous lawnmower (ARM), in particular for domestic applications, wherein other comparable purposes of use are also beneficial. For example, not only a mowing device but also a suction device (for example in the form of a vacuum cleaner), a sweeping device (for example of the type of a broom device and/or brush device for office surfaces or living space surfaces), a fertilizer application device and/or a watering device as well as comparable applications could also prove suitable as a working or function device which is to be provided on the vehicle according to the development.

According to the development, the navigation means are assigned a mapping unit which is designed to generate outline map data items as a reaction to the route section data items and/or the auto-correlation data items; in particular the successful travel along an entire path which encloses the working area, according to this development permits the generation of a map (outline map) which is then beneficial for the following use. According to the development it is therefore possible within the scope of the disclosure that, for example in the case of a loss of orientation for the vehicle during operation (for example during a mowing operation), re-orientation and therefore efficient further control of the operation can be carried out by simply traveling along a border wire or similar signal generator for a boundary of a working area.

According to the disclosure, there is advantageously provision according to a preferred development that the route sections (and correspondingly stored data items) have a constant length (along the path); this facilitates the data processing by the auto-correlation means and furthermore the necessary storage expenditure is reduced.

This effect has, as Stated above, in particular also the assignment of the angle information as orientation information for the path section data items; in addition, there is the advantage that a storage requirement for a sequence of path section data items increases (only) in proportion to the length of the path to the extent that the storage expenditure is reduced.

Within the scope of a preferred embodiment (best mode), a measurement or determination of the route sections is particularly preferably carried out by means of odometry. With this otherwise known procedure, a distance traveled by two wheels (arranged for example on the left and right) is measured, wherein a path which has been traveled along can be reconstructed from this information (for example by integration of the corresponding routes). In addition, within the scope of the disclosure and by means of the angle information an (absolute) orientation of the vehicle is measured. This information which is assigned to each set of the path section data items advantageously minimizes a measuring error on relatively long routes since the (compass) measuring error is, in contrast to the odometry data items, independent of a route which has already been traveled along. Merging these two types of information, for example by means of a Kalman filter, then permits a favorable estimation of the position and orientation, during which estimation the error in the orientation remains restricted and increases only slowly in the position. Correspondingly, the relative error between two positions on the path is also dependent on the distance between these positions along the path and for a preferably assumed constant distance.

According to a further preferred embodiment of the disclosure, the electronic memory unit is assigned a unit for data compression, which can be implemented, for example, by means of a central control unit or similar processor or controller unit. This advantageously permits in a development that when there is a large quantity of data which exceeds the storage capacity of the memory unit, the path section data items which are to be stored are reduced, more preferably, for example, by averaging successive path section data items (for example by forming a direction mean value) and replacing this pair of data items by one data item.

While it is advantageous according to the disclosure to limit the working area (in the manner which is otherwise known) by means of a border wire which then interacts in turn with the vehicle with a suitable sensor system, the present disclosure is not restricted hereto. In this context the disclosure includes also providing other means, optical or magnetically effective sensor means, which are capable of detecting the working area and the boundaries thereof, with the result that to this extent the path which encloses the working area can be traveled along in the manner provided according to the disclosure.

As a result, the disclosure makes it possible to provide, in a surprisingly simple and elegant fashion, a self-steering (=autonomous) vehicle which can reliably detect with little expenditure the travel along a path around a working area, while minimizing incorrect detection of route section which have already been traveled along and/or which can detect travel along the entire path.

Further advantages, features and details of the disclosure emerge from the following description of preferred exemplary embodiments and with reference to the drawings.

DETAILED DESCRIPTION

Figure 1:
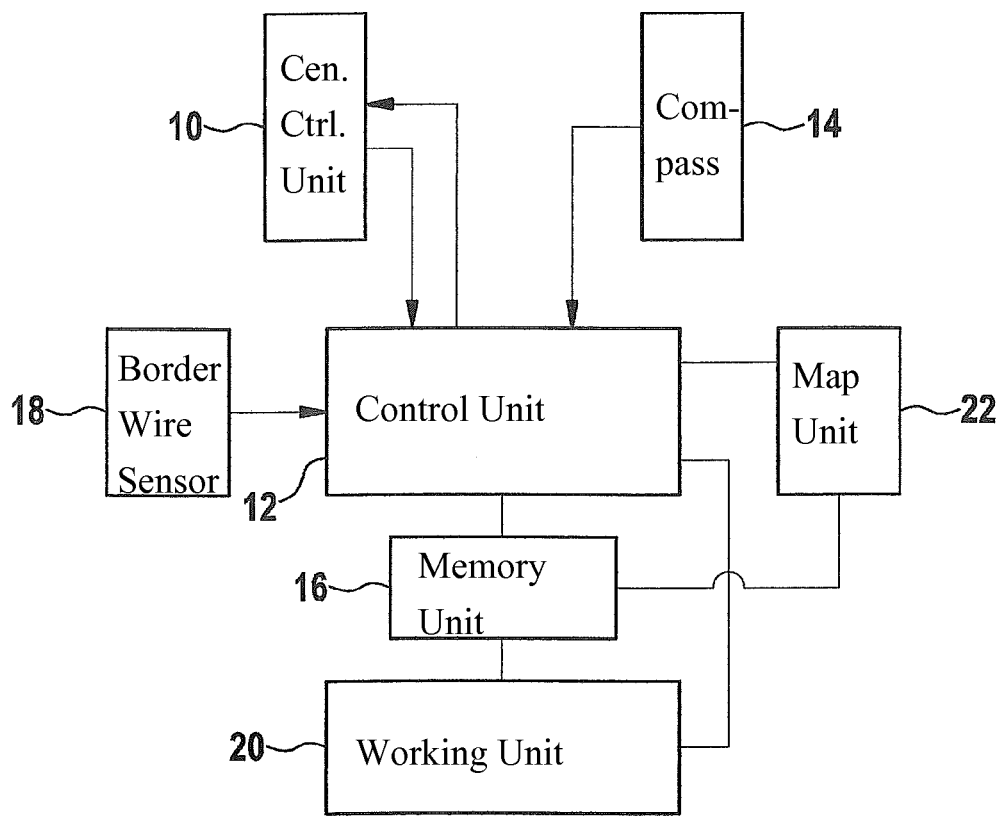
FIG. 1 is a schematic block circuit diagram of the self-steering (autonomous) vehicle according to a first exemplary embodiment of the disclosure with functional components provided for this purpose.

FIG. 1 clarifies schematically the functional components for implementing an autonomous lawnmower as an exemplary embodiment for a self-steering vehicle. Firstly, a working or function unit 20 in the form of a mowing mechanism is provided on a chassis or a platform (not specifically shown). Said mowing mechanism is actuated (in particular activated and deactivated) by a central control unit 12 which controls and coordinates various functionalities of the device shown in FIG. 1, implemented, for example, by means of a suitably programmed microcontroller.

A drive unit 10, which not only permits the lawnmower unit to travel straight ahead but also around bends in an otherwise known fashion, for example by means of a pair of motor driven drive wheels (clarified by the double arrow) but is also provided with an (otherwise) known odometry unit which suitably makes available odometry data items to the central control unit 10, interacts with the central control unit 12.

Additionally connected to the central control unit is a compass unit 14 which makes available direction information (suitably digitized), for example as a compass value, in a suitable way for path section data items which are to be successively generated.

Figure 2:
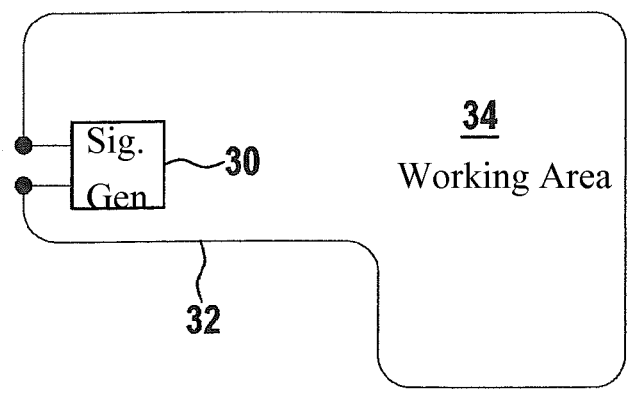
FIG. 2 is a schematic illustration clarifying a working area of a surface which is surrounded by a border wire.

The central control unit 12 also operates together with a border wire sensor unit 18 which detects, for example by means of an otherwise known magnetic field sensor system, that the vehicle is located at a border wire 32 which encloses a working area 34 (FIG. 2) (or can output information about a position relative to this wire). In an otherwise known fashion, this border wire 32 is provided, by means of a schematically shown signal generator unit 30, with a signal which can be correspondingly detected by the unit 18.

Figure 3:
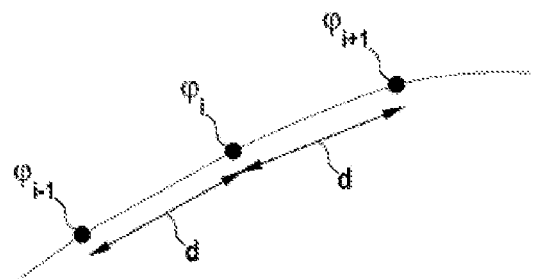
FIG. 3 is a schematic illustration clarifying route sections and associated path section data items; at regular intervals d (measured by means of odometry) the respective orientations (directional angles) $\phi_i$ are stored.

The significant functionality of the central control unit 12 is to calculate an auto-correlation and generate corresponding correlation data items from a sequence of path section data items which have, in the exemplary embodiment shown, a direction angle $\phi$ for each route section of a constant length d (cf. FIG. 3) in such a way that it is possible to determine from said correlation data items whether a sequence of route sections of the path 32 (in FIG. 2) has already been traveled along:

In order to explain further this auto-correlation implemented according to the disclosure, the basic approach which is adopted is that two sequences of data items can be assumed as being correlated if the relationship between the elements in the sequence is not random. A sequence is auto-correlated if there is an offset t, with the result that the sequence correlates with the same sequence which is, however, displaced by t.

For the further discussion of the exemplary embodiment it will be assumed that the path is divided into fixed intervals d and represented by n orientations. Here, $\phi_i$ (i=0...n−1) is the i-th orientation, acquired from the compass unit 14. The following equation $$Y(\tau) = \frac{1}{n-\tau} \sum_{i=\tau}^{n} (\varphi - \varphi_{i-\tau})^2$$

applies as a measure of the auto-correlation, wherein the difference between two orientations is defined canonically by the smallest angular interval. The smaller the value $\gamma(\tau)$, the more the sequence is auto-correlated with this definition. If the sequence $\gamma$ is periodic with the period $\tau$ (which corresponds to the time when a starting point is reached when the path is traveled along, FIG. 2), a statement about the order of magnitude of $\gamma(\tau)$ can be made under the given conditions: it will be assumed that the compass measurement $\phi_i$ is subject to a measuring error of variance $\sigma^2$ independently of i. A variance of $2\sigma^2$ for the terms $(\phi_i - \phi_{i-\tau})$ and a variance of the creation of an outline contour for an autonomous robot $$\frac{2}{n-\tau} \sigma^2$$

or a standard deviation of $$\sqrt{\frac{2}{n-\tau}} \sigma$$

is obtained from basic probability-theoretical considerations. A possible period is thus at a point $\tau$ if the value of $\gamma(\tau)$ does not exceed a certain multiple of the calculated standard deviation. For example, just one of a million measurements of $\gamma(\tau)$ is greater than six standard deviations under the given assumptions.

A further condition facilitates the finding of periods in the given application. Once the autonomous platform has completely traveled along the contour, it has rotated a total of $2\pi$ or $-2\pi$ depending on whether the contour was traveled along in the clockwise direction or in the counterclockwise direction. During the calculation of $\gamma(\tau)$, firstly the angles $\phi_i$ should then therefore not be normalized, i.e. an orientation of 0° differs from an orientation of 360° in that the platform has rotated once about its own axis in the mathematical clockwise direction compared to the starting orientation. Secondly, the difference $\phi_i - \phi_{i-1}$ should be calculated in such a way that a difference of $2\pi$ or $-2\pi$ between the unnormalized angles can supply a result of 0, that is to say $$\varphi_i - \varphi_{i-\tau} := \begin{cases} \varphi_i - \varphi_{i-\tau} - 2\pi & \varphi_i - \varphi_{i-\tau} > 0 \\ \varphi_i - \varphi_{i-\tau} + 2\pi & \text{otherwise} \end{cases}.$$

Figure 4:
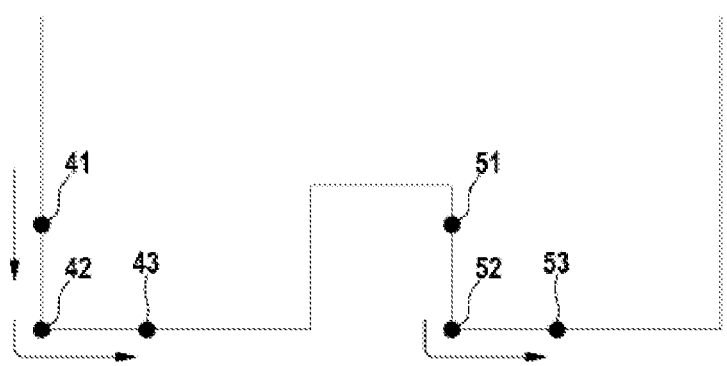
FIG. 4 is a clarification of the need to avoid incorrect registrations and corresponding conclusions by the navigation unit to carry out no correlation on the basis of a fixed number of route sections.

Owing to the specified limits and using this angle difference formula, all the possible periods $\tau$ can be determined for each point in time n. If only a local minimum of $\gamma(\tau)$, which is a possible period, is then obtained in this context, this is not yet unambiguous (as is clarified with reference to FIG. 4: the sequence 41/42/43 is not unambiguous with respect to the sequence 51/52/53 so that a possible error determination can take place). However, if a period t can still be detected after a distance of $2\tau$ has been traveled along and if no further period can be detected, the problem is unambiguously solved. In order therefore to reliably detect when the starting point is reached it is necessary to travel along the contour twice.

Correspondingly, the memory unit 16 which is shown schematically in FIG. 1 contains the sequence of path section data items which is generated in this way and which is evaluated for auto-correlation by the central control unit in the way described above.

In this context, the present disclosure has, in the implementation form shown, advantages with respect to the administration of storage and the storage requirement, which also has advantageous effects on the time required for the computational evaluation: in the first approach, with a distance resolution of d, a memory field has to be provided for the unnormalized orientation. With the same resolution, memory fields for the function $\gamma(\tau)$ have to be provided. After each route section d, a new orientation direction value therefore has to be stored. Furthermore, the function $\gamma(\tau)$ has to be updated for each $\tau$. In this context, it is not necessary to reevaluate the entire sum, the new $\gamma(\tau)$ is obtained in an obvious way from the old value as well as the new orientation. The expenditure on storage therefore increases linearly with the distance traveled, as does the time required. The time required can, however, be reduced by considering only those possible periods $\tau$ which pass the standard deviation test described above. As soon as this test fails once, this possible period is no longer considered. For this purpose, in addition to each memory field for the function $\gamma(\tau)$, an indicator field is provided which indicates the next memory field. A concatenated list is therefore produced which contains all the possible candidates. If a possible period does not pass the standard deviation test, the corresponding memory field is removed from the concatenated list. The time required for updating is therefore proportional to the number of still possible candidates.

If a memory limit is to be provided for the storage of the contour, a constant memory consumption can be achieved by means of the following methods. If the number of memory cells of the contour exceeds a given maximum number, in each case two fields are combined by one (by averaging the orientations), and the same is carried out for the stored function values $\gamma(\tau)$. For the further profile, the value of d is doubled. Half of the maximum number is therefore available again for extending the map.

If a period is to be reliably determined, its precise value can be obtained more precisely than the increment d by determining the minimum using the value of the adjacent memory cells.

If the path or the period is reliably determined in the prescribed way, according to one development there is provision to generate an outline map. For this purpose, a mapping unit 22 is symbolically assigned to the central control unit 12, which clarifies that a map can be generated with otherwise known procedures, for example with techniques which are known from the robotic literature, such as for example SLAM (in particular loop closing there). Such technologies are described, for example, in F. Lu and E. Milios, "Globally consistent range scan alignment for environment mapping" in: Autonomous Robots, vol. 4, 1997, wherein to this extent and for the purpose of implementation of features of the disclosure this disclosure is to be considered as being included in the present disclosure and as forming part of the disclosure.

The outline map then permits the implementation of an important basic functionality of an autonomous robot such as the ARM described in the exemplary embodiment, specifically the determination of location with respect to the map. This relates both to the chronological progression of the position of the vehicle given a known position as well as to the determination of the position with respect to the map given an unknown position.

In the first case, what is referred to as a particle filter is used, as described, for example, in S. Thrun, W. Burgard, D. Fox, Probabilistic Robotics, MIT Press 2005.

In the second case, the ARM firstly moves to the border wire 32, wherein this can be done, for example, by random navigation which is active until the border wire 32 is reached. The robot then begins to travel along the border wire 32 and in doing so compares the path traveled with the outline map as described above, with the aid of the described auto-correlation function (or associated auto-correlation data items) until the position on the border wire is unambiguously determined.

The ability of an average person skilled in the art includes here not only making a direct comparison between the recorded sequence and the outline but also, for example, providing a particle filter or a histogram filter, as described above in S. Thrun e.a., Probabilistic Robotics.

The present disclosure is not restricted to the exemplary embodiment shown or to the "lawnmower" application; instead, numerous variants and alternative embodiments are conceivable. In this context, the determination of the working area 34 by means of a border wire is merely an example; alternatively, the unit can have a suitable sensor system (for example a lawn sensor, implemented, for example, in an otherwise known fashion, by camera means) with which it is easily possible to travel along the boundaries of the working surface.

The invention claimed is:

1. A self-steering vehicle which is configured to perform autonomous locomotion on a surface, comprising:
   a drive mechanism for locomotion; and
   a navigation mechanism, wherein the navigation mechanism is configured to determine positions along a closed border enclosing a working area of the surface, wherein the navigation mechanism is further configured to generate successive path section data items, and wherein the path section data items for route sections of the path each have an assigned orientation information item,
   wherein the navigation mechanism includes an auto-correlation mechanism which is configured to generate auto-correlation data $\gamma(\tau)$ from a sequence of path section orientation data $\phi$ corresponding to locomotion along the path according to the following equation;

$$\gamma(\tau) = \frac{1}{n-\tau}\sum_{i=\tau}^{n}(\varphi - \varphi_{i-\tau})^2$$

said navigation mechanism further configured to determine from said auto-correlation data whether and/or that the vehicle has completely traveled along the enclosing border and/or a sequence of route sections which has already been traveled along is being traveled along again,
   wherein the navigation mechanism has an electronic memory unit for storing the sequence of path section data items; and
   further wherein a mechanism configured to perform data compression of the path section data items is assigned to the electronic memory unit.

2. The vehicle as claimed in claim 1, wherein the vehicle is configured as a carrier for a working and/or function unit.

3. The vehicle as claimed in claim 2, wherein the working and/or function unit is one of a mowing device, a suction device, a sweeping device, a fertilizer application device and a watering device.

4. The vehicle as claimed in claim 1, wherein the navigation mechanism is assigned a mapping unit which is configured in such a way that it generates outline map data items of the surface which is enclosed by the closed border, on the basis of the route section data items and/or the auto-correlation data items.

5. The vehicle as claimed in claim 1, wherein the route sections each have a constant length along the path.

6. The vehicle as claimed in claim 1, wherein a length of the route sections is determined by odometry, and wherein an odometry device is assigned to the drive mechanism and to the navigation mechanism.

7. The vehicle as claimed in claim 1, wherein the navigation mechanism is configured to interact with a border wire which defines the closed border and which provides a signal which is configured to be detected by the navigation mechanism.

8. The vehicle as claimed in claim 1, wherein the navigation mechanism is configured to interact with a sensor unit configured to detect the working area in the surface and the boundaries thereof.

9. The vehicle as claimed in claim 1, wherein the assigned orientation information item includes an angle information item.

10. The vehicle as claimed in claim 1, wherein the mechanism configured to perform data compression of the path section data items is configured to generate a logic operation of orientation information of successive path section data items for the purpose of data compression.

11. The vehicle as claimed in claim 10, wherein the logic operation is averaging.

12. The vehicle as claimed in claim 1,
   wherein the navigation mechanism is configured to interact with a border wire which defines the closed border and which provides a signal which is configured to be detected by the navigation mechanism.

* * * * *